Oct. 13, 1970 A. MERENDA 3,533,665
BEARING
Filed Dec. 5, 1967 2 Sheets-Sheet 1
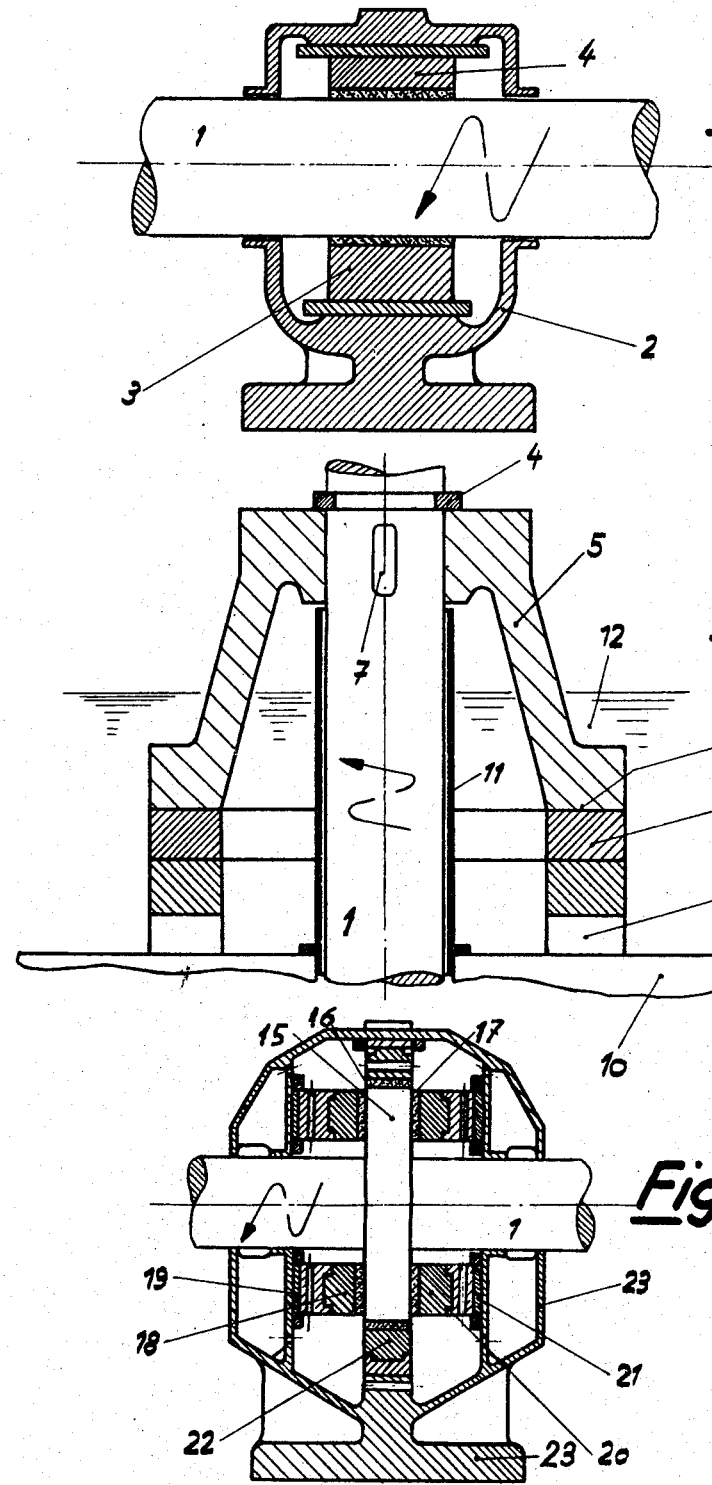
INVENTOR
ADRIEN MERENDA
BY Emery L. Groff Jr.
ATTORNEY Oct. 13, 1970  A. MERENDA  3,533,665
BEARING
Filed Dec. 5, 1967  2 Sheets-Sheet 2
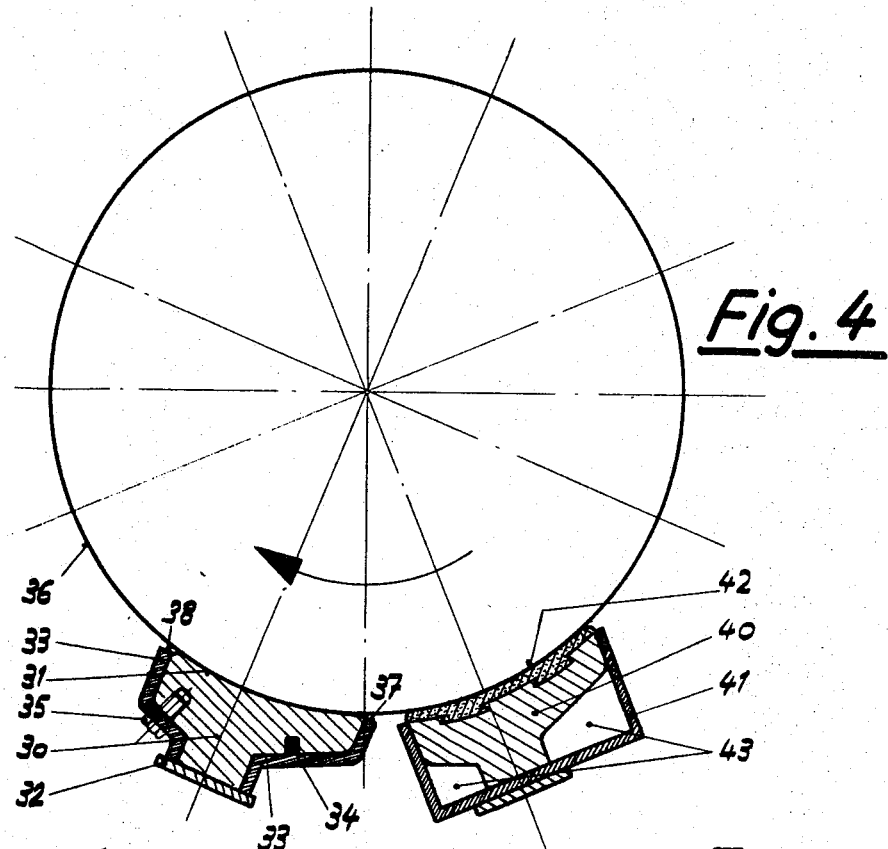
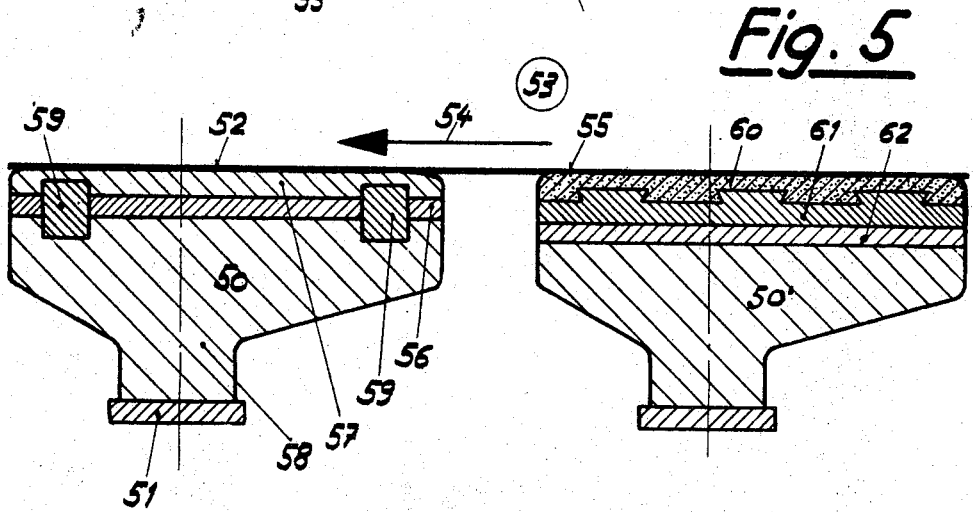
INVENTOR
ADRIEN MERENDA
BY  Emory L. Groff Jr.
ATTORNEY 3,533,665
BEARING
Adrien Merenda, Clarens, Switzerland, assignor to Ateliers de Constructions Mecaniques de Vevey S.A., Vevey, Vaud, Switzerland, a company of Switzerland
Filed Dec. 5, 1967, Ser. No. 688,057
Claims priority, application Switzerland, Dec. 29, 1966, 18,838/66
Int. Cl. F16c *33/12*
U.S. Cl. 308—73
3 Claims

ABSTRACT OF THE DISCLOSURE

Thrust and/or guide bearing, for a rotating shaft, including at least one primary active surface solid with the shaft, at least one set of shoes which act as secondary surfaces, at least one shoe including at least one part made of a material of a lesser conductor of heat than the main material of the shoe, designed to reduce the amount of the friction energy evacuated by thermic conduction through the shoe in order to equalize the temperatures existing in different points of the shoe, and thereby reduce its deformation.

---

Large rotating devices, such as for example hydroelectrical assemblies include one or several elements to support or guide the rotating masses which are often very important.

These elements: bearings, pivots, thrust-bearings, include at least one series of nonrotating shoes, fitted in such a way that they can oscillate and assume, in relation to the corresponding rotating surface, a position making possible the formation of a film of oil between the two surfaces. This film is absolutely necessary from the very beginning of operation of the machine.

Two active surfaces are in contact with this film: one active rotating surface, solid with the shaft; one nonrotating surface, solid with each shoe. Quite often, a part of this shoe, including precisely the active surface, is made of a softer metal which has very good friction qualities in respect to the material of the active rotating surface.

The rotation and the loads supported by these parts induce the development of a friction energy in the film of oil. The strength of this energy depends, among other things, on the viscosity of the oil, on the relative speed between the rotating surfaces and the fixed active surfaces, of the load, on the shape of the shoe and of the thickness of the film of oil, etc.

These supporting parts are built in such a way that they first ensure the automatic formation of a stable film of oil, and then reduce to a minimum the energy developed in it. The energy is a loss; it induces a rise of the temperature of the oil, of the shoes, and of the respective parts in rotation. Very often it has to be carried away, for example by a special refrigerating installation for oil, working with a water-circuit.

The temperature reaches its highest point in the part of the exterior surface of the shoe which is in contact with the film of oil, that is to say the active surface. The rise of temperature is more important where the film of oil is hotter. Therefore, it takes place in the proximity of the point of exit of the oil from the shoe.

As the shoe is generally completely immersed in an oil bath, its other surfaces have a temperature approximately the same as that of the oil. There is therefore, permanently, a difference of temperature between the various points of the material of the shoe, caused on one hand, by the heat-source in contact with its active surface, and on the other hand, by the flow of calorific energy going through the shoe towards the coldest surfaces. The difference of temperature causes various dilatations which induce in their turn a deformation of the shoe. The active part, i.e., the surface in contact with the film of oil, tends to lengthen and to become convex. This deformation disturbs the film of oil, especially when the machine is running, but also when it stops, while the shoe is still hot.

The subject of this invention is a thrust and/or guide bearing for a rotating shaft, including at least one primary active surface solid with the shaft, at least one set of shoes which act as secondary surfaces and fitted in such a way that they create, from the very start of and during the whole rotation of the shaft, a film of oil separating the primary and secondary active surfaces in which some of the friction energy is evacuated by thermic conduction through the shoes. The invention is characterized by the fact that at least one shoe includes at least one part made of a material which is a lesser conductor of heat that the main material of the shoe, to reduce the amount of the friction energy evacuated by thermic conduction through the shoe, in order to equalize the temperature existing in different points of the shoe, and reduce its deformation.

The enclosed drawings represent as an example, schematically, several designs of the bearings, according to the invention. In said drawings:

FIG. 1 represents a bearing which includes shoes for a horizontal shaft.

FIG. 2 represents the thrust-bearing of a vertical machine.

FIG. 3 represents a thrust-bearing, combined with a radial bearing.

FIG. 4 represents two shoes of a bearing.

FIG. 5 represents two shoes of a thrust-bearing.

Generally speaking and for the FIGS. 1 to 3 the same corresponding parts have the same reference numerals.

The construction described below applies to all kinds of elements built to support moving masses and including shoes, whether these elements are bearings to support or guide a vertical, horizontal or oblique shaft, or thrust-bearings supporting an axial thrust, or combined thrust-bearings which can absorb simultaneously radial and axial loads.

FIGS. 1, 2 and 3 represent these various cases.

FIG. 1 represents a bearing with shoes. It shows the following main elements: a shaft 1 in rotation, a supporting frame 2, a lower shoe 3, and an upper thrust ring 4. The weight of the rotating masses is supported by different shoes of the bearing. The space between the shoes and the shaft of the frame 2 is filled with oil, which can, by a tubing system, not shown in the drawings, be constantly renewed and cooled during the rotation.

FIG. 2 represents an axial thrust-bearing. In this case, the shaft 1 is vertical. It transmits its own weight, as well as the weight of the rotating parts located on itself, to the bearing, through a ring 4 in two parts, fitted in a throat made on the shaft. A thrust collar 5 engages this ring. Its lower end is an active surface 6 which is solid with the shaft. The thrust collar 5 is put into rotation with shaft 1 by a key 7. A series of shoes 8 is fitted on a ring 9 and engages the inferior base of the thrust-bearing 10. An internal pipe 11 separates the interior volume of the thrust-bearing from the shaft, which filling of the thrust-bearing with oil 12 in which the active elements can be completely immerged. The exterior and cover walls have not been shown.

FIG. 3 represents a radial bearing combined with a double axial thrust. The shaft 1 includes, fixed rigidly on itself, a ring 15 fabricated so that it has two active surfaces, left 16 and right 17. A series of shoes 18 similar to those of FIG. 2 relies on the side 16 of the thrust-ring 15 and on the side 21 of the support-frame. A second series of shoes 20 relies on the right side 17 of the thrust-ring 15 and on the side 21 of the support-frame. These two series of shoes act as axial thrusts and prevent any axial displacement, on the left or on the right of the shaft 1. A third series of shoes 22 is fitted on the cylindrical wall of the thrust-ring 15 and engages the frame 23. This series of shoes plays the same part as the shoes 3 and 4 of FIG. 1 and absorbs the radial loads. In FIGS. 1 and 3 the shaft is horizontal; in FIG. 2 it is vertical. It is obvious that one could represent the same elements with other positions of the shaft and also foresee a bearing, according to FIG. 1 to guide a vertical axis.

FIG. 4 shows two different designs of the shoes of a bearing supporting or guiding a rotating shaft. The left shoe includes the following parts: a body 30 which constitutes the shoe itself. Its interior side 31 is the active surface of the shoe. Its shape is chosen to promote the creation of a film of oil. The shoe relies, through a plate 32 on a support absorbing the thrusts. This support is not represented in the drawings. The radial load from the shaft is transmitted, according to its direction, to the different shoes which are in that direction. This figure shows that the exterior surface of the shoe has been covered with a coat of material 33, which is a strong thermic insulating material, resisting the oil in which the shoes are immerged. There are different ways of attaching this insulating material. For example, it can be glued on, or projected with a spraying pistol, or casted and anchored in the shoe with anchor plates 34, or fixed with screws 35. The active surface of the rotating elements 36 is the surface of the cylindrical wall of the shaft, and corresponds to the active surface 31 of the shoes.

The system works as follows:

When the machine is running, owing to the shape of the whole shoe, to its active surface 31, to the position of the support 32, to the presence of the oil, the latter penetrates through the entrance slot 37 and is driven by its viscosity between the active surfaces 36 of the shaft and 31 of the shoe, forming a film which separates the two surfaces. The thickness of this film is roughly a tenth of a millimeter.

During the rotation, from the entrance 37 to the exit 38 the film of oil is laminated. This induces a strong development of energy which causes a rise of the temperature of the oil and heats it as well as the surfaces in contact with it, i.e., the active surfaces 31 and 36. The rise of temperature will be transmitted through all the massive parts. As the shoe is coated on its exterior surface with a material which is in fact a thermic insulator, the conduction of heat through that shoe is practically non-existent; it does not heat the oil of the thrust-bearing, but only the material of the shoe itself. The exterior surface of the shoe in contact with the interior surface of the insulating material is, after a while, practically at the same temperature as the surface of the shoe, since the calorific flow is restricted.

While it is working the shoe is submitted to a rise of temperature which is the same in all its points. The dilatations are everywhere the same, the shoe staying, when the temperature has had time to settle, "similar to itself," whether the machine is stopped or running.

FIG. 4 shows on the right another possible design of a shoe. The insulating element, instead of being fixed directly on the exterior surface of the shoe 40, forms an insulating box 41, of plain geometrical shape, surrounding completely the exterior surface of the shoe, except the active surface 42. The oil 43 in the box 41 is kept inside and submitted to the same temperatures as the shoe itself. Therefore, the operation is identical to that of the shoe 30.

FIG. 5 shows two different designs of a shoe, this time for a thrust-bearing. The left shoe 50 engages supporting means, not represented in the drawings, through a plate 51. The active surface 52 of the shoe engages the moving thrust-ring 53 which corresponds to the thrust-collar 6 of FIG. 2. This thrust-ring 53 turns in the direction indicated by the arrow 54. The lower face is its active surface 55. As before, the two active surfaces 52 and 55 of the shoe 50 and of the thrust-ring 53 are separated by a film of oil. This shoe includes an insulating plate 56, located in the proximity of its active surface 52. So, the shoe includes three main parts: one sole including the active surface 52, a main body portion 58 and the insulator 56 which is fixed between the body portion 58 and sole element 57. Keys, such as pins or set-pins 59 are fitted between the parts 56, 57 and 58 to keep their relative positions.

This shoe works as follows:

The rotation of the thrust-ring induces a rise in the temperature of the surface 52 of the shoe. The latter is transmitted very rapidly to the whole mass which composes the part 57 and which is very thin. But, thanks to the insulator 56, this rise of temperature is not transmitted, or only very weakly, to the body 58 of the shoe 50. So, this part 57 is submitted to a temperature approximately the same as that of the oil in contact with the exterior surfaces. There is no passage of a thermic flow to influence the shoe and the temperatures in the part 58 will be practically the same. At a uniform speed the part 57 keeps its shape. Practically all the points of the sole 57 are at the same temperature corresponding approximately to that of its active surface 52. This part is uniformly warm; therefore the body of the shoe stays at the same temperature as the oil-bath. The shoe 50 made of the essential parts 56, 57 and 58 stays "similar to itself" whether the thrust-bearing is running or stopped.

It is obvious that, in the beginning, the sole of the shoe is still cold; it takes a certain time until all the parts of the thrust-bearing and the oil reach are stable uniform temperature. The two-part sole 60, and 61, of the right shoe 50' of FIG. 5 corresponds to the sole 51 of the left shoe.

However, it is made of two different materials, for example an alloy of several metals, including a high proportion of tin and with good antifriction qualities, for the fabrication of the upper part 60 of the sole which includes the active surface, and a material which would be a good heat-conductor, such as copper, for the execution of the lower part 61 of the sole, which engages a thermic insulator 62. The shoe also includes elements necessary for setting the relative positions of its various elements. These elements have not been represented in the figure. The working of this shoe is similar to that of the precedent; the inclusion of a good conductor 61 located on the thermic insulator 62, gives a better equalization of the temperature of the sole made of the parts 60 and 61 of the shoe, preventing any deformation of its active surface.

The particular construction of the shoes represented in FIGS. 4 and 5 applies to the three types of bearings shown schematically in FIGS. 1 to 3, and also to any other shape of bearing.

I claim:

1. A rocking bearing for support of a rotating shaft presenting a moving primary active surface integral with the shaft, comprising, at least one set of bearing shoes each having a sole element providing a secondary active surface juxtaposed said primary active surface in mating relationship, means providing a film of oil between said primary and secondary active surfaces both at the start of and during the entire period of rotation of said shaft whereby a portion of the friction energy of the bearing is transmitted by thermic conduction through shoes, at least one said shoe including a main body portion, an insulating member of nonelastomeric material overlying said main body portion adjacent said sole element, said insulating member having a lesser heat conductivity than said main body portion thereby reducing the amount of friction energy transmitted by thermic conduction through said shoe thereby tending to equalize the temperatures existing in different points of the shoe, and reduce deformation thereof, and means supporting said shoes for oscillation as said shaft rotates.

2. The bearing according to claim 1 wherein said secondary active surface and said insulating member are planar.

3. The bearing according to claim 1, including key means extending from said insulating member and interlocking said insulating member with said sole element.

References Cited

UNITED STATES PATENTS

| 3,033,619 | 5/1962 | Ertl | 308—160 |
|---|---|---|---|
| 3,062,598 | 11/1962 | Summers | 308—160 |
| 3,131,005 | 4/1964 | Wagley | 308—160 |
| 2,566,715 | 9/1951 | Bessiere | 308—77 |
| 3,053,587 | 9/1962 | Wallgren | 308—73 |
| 3,119,640 | 1/1964 | Laudig | 308—238 X |
| 3,131,004 | 5/1964 | Sternlight | 308—73 |
| 3,423,279 | 1/1969 | Grover | 308—237 |

FOREIGN PATENTS

| 126,315 | 1/1948 | Australia. |
|---|---|---|
| 352,898 | 7/1931 | Great Britain. |

WESLEY S. RATLIFF, JR., Primary Examiner